(12) United States Patent
Hanawa (10) Patent No.: US 6,370,261 B1
(45) Date of Patent: Apr. 9, 2002

(54) VEHICLE SURROUNDINGS MONITORING APPARATUS

(75) Inventor: Keiji Hanawa, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/238,228

(22) Filed: Jan. 27, 1999

(30) Foreign Application Priority Data

Jan. 30, 1998 (JP) ............................................ 10-018438

(51) Int. Cl.[7] ................................................. G06K 9/00
(52) U.S. Cl. ........................ 382/104; 382/104; 382/100
(58) Field of Search .............................. 382/104, 103, 382/106, 154, 199, 201, 209, 216; 701/301, 2; 340/435, 907, 461, 933; 356/3.14; 348/116, 113

(56) References Cited

U.S. PATENT DOCUMENTS

| 5,410,346 A | * | 4/1995 | Saneyoshi et al. | ........... 348/116 |
| 5,530,420 A | * | 6/1996 | Tsuchiya et al. | ............. 340/435 |
| 5,633,705 A | * | 5/1997 | Asayama | ................... 356/3.14 |
| 5,670,935 A | * | 9/1997 | Schofield et al. | ........... 340/461 |
| 5,949,331 A | * | 9/1999 | Schofield et al. | ........... 340/461 |
| 6,122,597 A | * | 9/2000 | Saneyoshi et al. | ........... 701/301 |
| 6,169,572 B1 | * | 1/2001 | Sogawa | ....................... 348/113 |

FOREIGN PATENT DOCUMENTS

| JP | 5265547 | 10/1993 | ............ G06F/15/62 |
| JP | 6266828 | 9/1994 | ............ G06F/15/62 |

* cited by examiner

*Primary Examiner*—Leo Boudreau
*Assistant Examiner*—M B Choobin
(74) *Attorney, Agent, or Firm*—Martin A. Farber (57) ABSTRACT

Distance image outputted from an image processor is read by a recognition/judgment computer, in which the distance image is divided into strips having a specified interval and a histogram is prepared for each strip. Based on the histogram, the position of solid objects and the distance thereto are obtained and these positional data of the solid objects are classified into groups of solid object and groups of side wall. Further, the position of a wall surface forming a boundary of a road is detected from the data of the groups of side wall. On the other hand, assuming a wall surface model composed of a series of nodes, respective nodes are determined and corrected by the data of side wall. Thus obtained nodes form a successive wall surface along a curved road.

3 Claims, 13 Drawing Sheets

VEHICLE SURROUNDINGS MONITORING APPARATUS

BACKGROUND OF THE INVENTION

1. Field of the Invention

The present invention relates to a vehicle surroundings monitoring apparatus and more in particular to a vehicle surroundings monitoring apparatus suitable for detecting solid objects successively disposed along roads such as guardrails, side walls and the like.

2. Prior Arts

With increased number of vehicles and with increased number of traffic accidents, the conception of Advanced Safety Vehicle (ASV) is becoming one of primary strategies in designing a vehicle. In particular, an ASV technology raises the intelligence level of a vehicle through the state of the art electronic technologies. In recent years, various safety devices such as issuing an alarm to inform a vehicle driver of a likelihood of collision, stopping a vehicle, decreasing or increasing the speed of the vehicle by detecting a vehicle traveling ahead or an obstacle through a television camera, a laser-beam radar or the like, have been proposed.

The applicant of the present invention, in Japanese Patent Application Laid-open No. Toku-Kai-Hei 5-265547, have already disclosed a technique in which images taken by two stereoscopic cameras are transformed into distance images, these distance images being divided into lattice-like small regions at a prescribed interval to detect solid objects for each small region. Further, the applicant, in Japanese Patent Application Laid-open No. Toku-Kai-Hei 6-266828, have already proposed a technique wherein similarly data of solid objects per small region are extracted, these data being processed by a so called "Hough" transformation method to detect the solid objects such as side walls and guardrails aligned along roads.

However, according to these known arts, since the data of solid objects are processed by the "Hough" transformation method and the like, as a result, with respect to the solid objects provided along a curved road like guardrails, only their small portions located within a relatively short distance are recognized as straight lines, therefore it is much more difficult to recognize those objects in the distance.

SUMMARY OF THE INVENTION

The present invention is intended to obviate the aforesaid problem of the prior arts and it is an object of the present invention to provide a vehicle surroundings detecting apparatus capable of detecting a series of solid objects which constitute a boundary of a road as a wall surface even in case where the road is curved.

In order to achieve the object, the present invention comprises a wall surface detecting means for dividing positional data of solid objects into groups and based on the grouped positional data of the solid objects for detecting a wall surface formed along a boundary of a road, a wall surface model forming means for interconnecting a plurality of nodes and based on the interconnected nodes for forming a wall surface model to express an outline of the side wall and a wall surface model correcting means based on the grouped positional data of the solid objects for correcting the wall surface model.

DETAILED DESCRIPTION OF THE PREFERRED EMBODIMENTS

Figure 1:
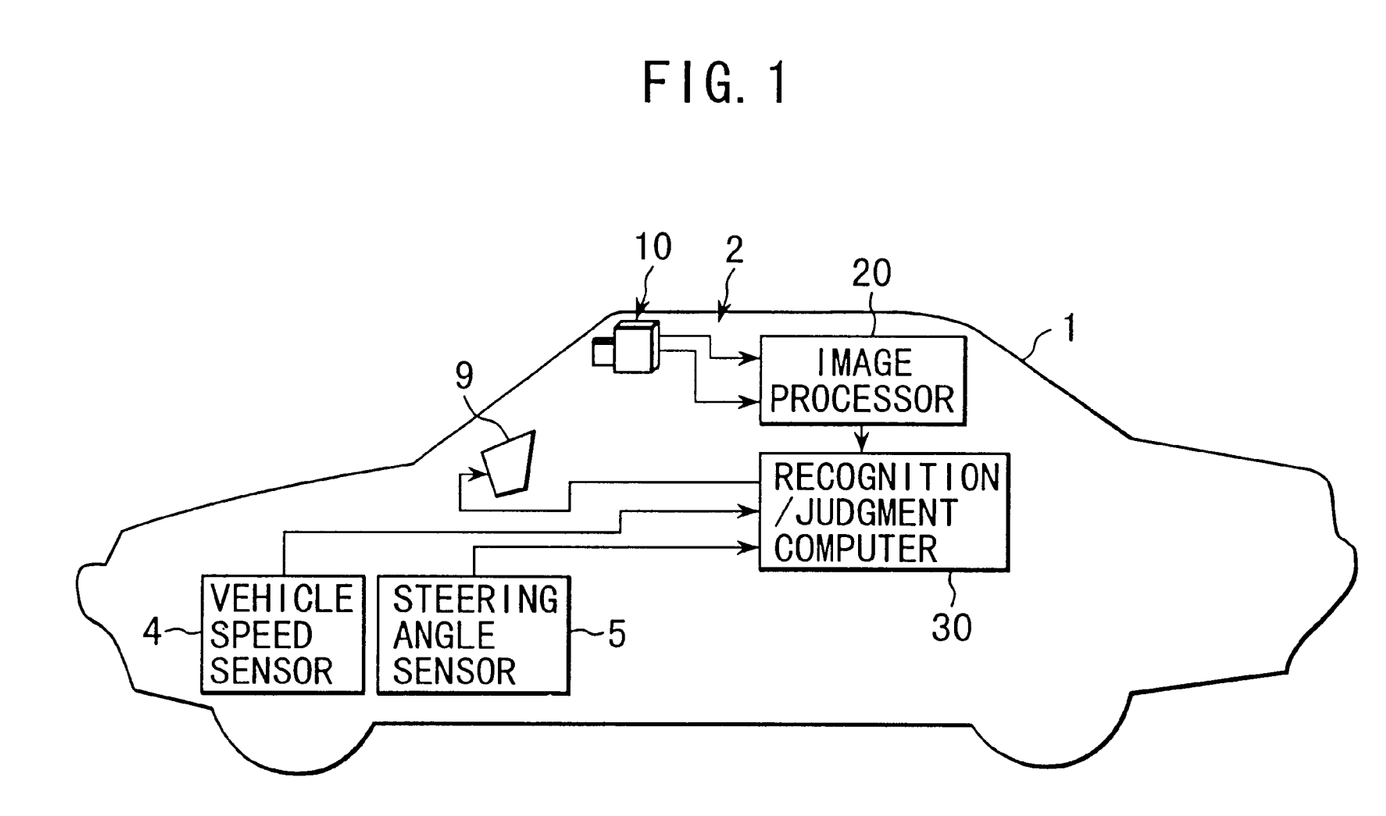
FIG. 1 is an overall view of a vehicle surroundings detecting apparatus mounted on a vehicle.

Referring now to FIG. 1, reference numeral 1 denotes a vehicle on which a vehicle surroundings monitoring apparatus 2 is mounted for imaging objects within a visible scope ahead of the vehicle and for recognizing the objects for monitoring. The vehicle surroundings monitoring apparatus 2 comprises a stereoscopic optical system 10 for imaging objects from two different positions, an image processor 20 for processing images of these objects to obtain three-dimensional distance distribution information, and a recognition/judgment computer 30 for detecting three-dimensional positions of roads and solid objects at high speeds based on the distance information inputted from the image processor 20, for identifying a preceding vehicle or an obstacle based on the result of the detection and for judging whether or not an alarm should be issued to avoid a collision with the preceding vehicle or the obstacle.

The recognition/judgment computer 30 is connected with sensors such as a vehicle speed sensor 4, a steering angle sensor 5 and the like in order to detect a present traveling condition of the vehicle and also it is connected with a display 9 provided at the front of a vehicle driver for informing hazard. Further, the computer 30 is connected with an external interface for example for controlling actuators (not shown) which operate so as automatically to avoid a collision with the obstacle or the vehicle traveling ahead.

The stereoscopic optical system 10 is composed of a pair of left and right CCD (Charge Coupled Device)cameras 10a, 10b. A pair of stereoscopic images taken by the CCD cameras 10a, 10b are processed in the image processor 20 according to the principle of triangulation to obtain three-dimensional distance distribution over an entire image.

The recognition/judgment computer 30 reads the distance distribution information from the image processor 20 to detect three-dimensional positions with respect to the configuration of roads and solid objects such as vehicles and obstacles at high speeds and judges a possibility of collision or contact with these detected objects based on the traveling condition detected by the vehicle speed sensor 4 and the steering angle sensor 5 of the self vehicle to inform the vehicle driver of the result of the judgment through the display 9.

Figure 2:
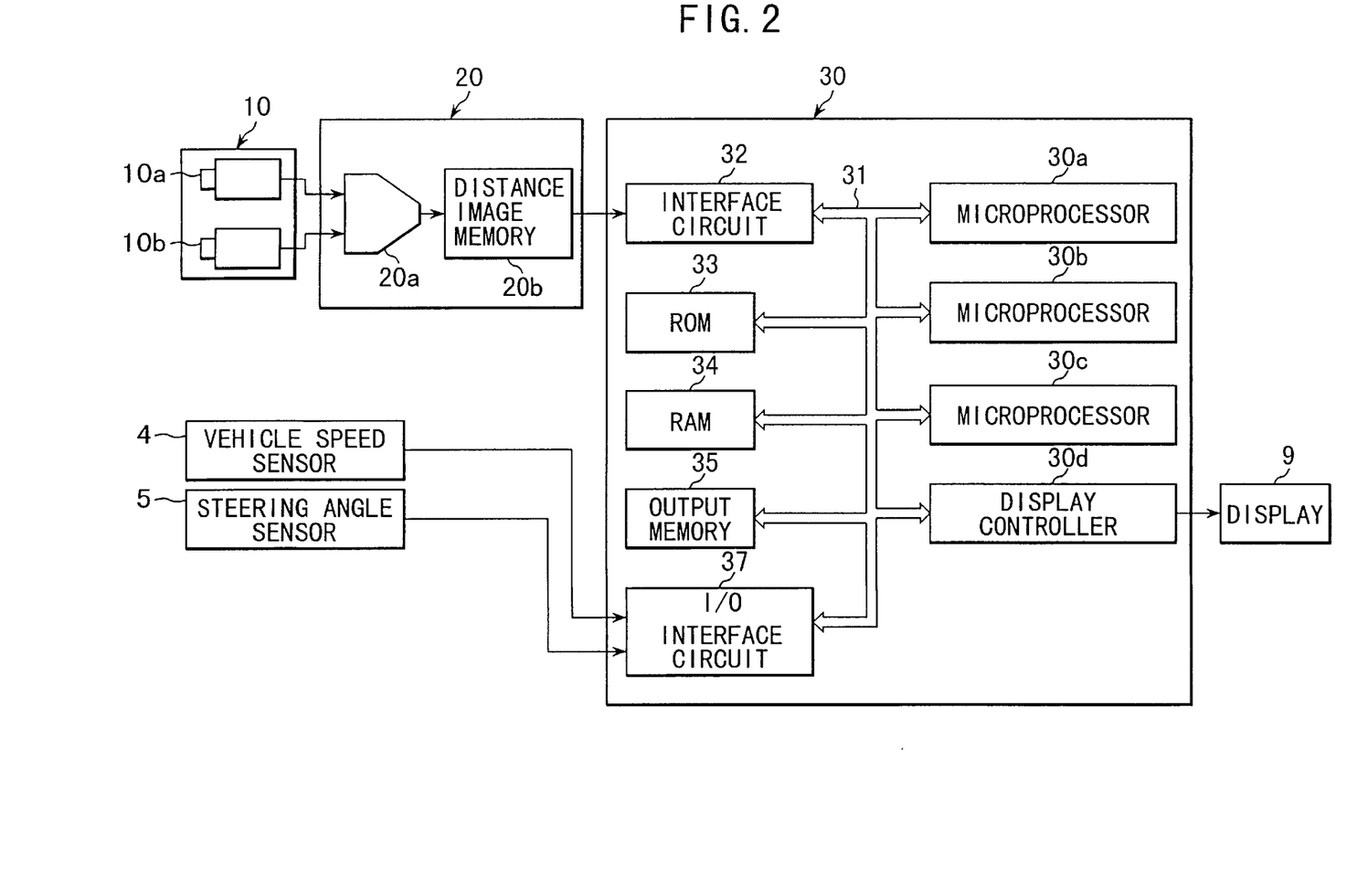
FIG. 2 is a schematic block diagram of a vehicle surroundings detecting apparatus according to the present invention.

FIG. 2 shows a constitution of the image processor 20 and the recognition/judgment computer 30. The image processor 20 comprises a distance detecting circuit 20a for producing distance distribution information and a distance image memory 20b for memorizing this distance distribution information. More specifically, the distance detecting circuit 20a calculates a distance to a given object by selecting a small region imaging an identical portion of the object from the left and right stereoscopic images taken by the CCD cameras 10a, 10b, respectively and then obtaining a deviation between these two small regions and outputs in the form of three-dimensional distance distribution information.

Figure 9:
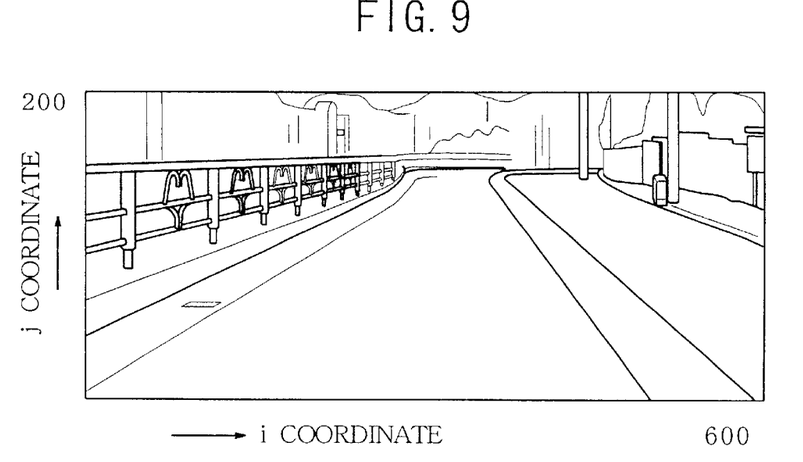
FIG. 9 is an explanatory view showing an example of images taken by cameras mounted on a vehicle.

FIG. 9 shows an example of either of images taken by the left and right CCD cameras 10a, 10b. When this image is processed by the distance detecting circuit 20a, the distance distribution information outputted from the distance detecting circuit 20a is expressed as a distance image as shown in FIG. 10.

Figure 10:
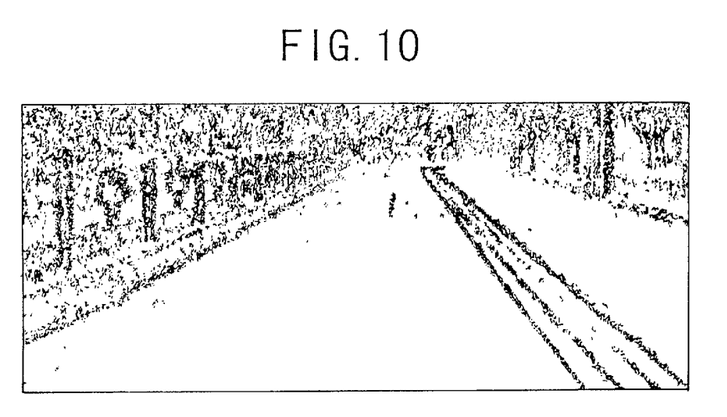
FIG. 10 is an explanatory view showing an example of distance images shown in FIG. 9.

The example of the distance image shown in FIG. 10 has a picture size composed of 600 (laterally)×200 (longitudinally) picture elements. The distance data are included in white dotted portions that correspond to the portions having a large difference of brightness between two adjacent picture elements aligned in the left and right direction respectively in the image shown in FIG. 9. Further, in this example, the distance detecting circuit 20a treats the distance image as an image composed of 150 (laterally)×50 (longitudinally) blocks, i.e., 4×4 picture elements for one block or one small region. The calculation of distance is performed for each block of the left and right images.

The recognition/judgment computer 30 comprises a microprocessor 30a primarily for detecting the road configuration, a microprocessor 30b primarily for detecting solid objects based on the configuration of a road detected and a microprocessor 30c primarily for identifying a preceding vehicle or an obstacle based on the positional information of the detected solid objects and for judging a possibility of collision or contact with the preceding vehicle or the obstacle and these microprocessors 30a, 30b, 30c are connected in parallel with each other through a system bus 31.

The system bus 31 is connected with an interface circuit 32 to which the distance image is inputted from the distance image memory 20b, a ROM 33 for storing a control program, a RAM 34 for memorizing miscellaneous parameters produced during calculations, an output memory 35 for memorizing the result of processing, a display controller 30d for controlling the display 9 and an I/O interface circuit 37 to which signals are inputted from the vehicle speed sensor 4 and the steering angle sensor 5.

As shown in FIG. 9, the distance image has a coordinate system composed of a lateral axis i, a longitudinal axis j and a vertical axis dp with an origin of the coordinates placed at the left below corner of the distance image. The vertical axis dp indicates a distance to an object which corresponds to the deviation amount between blocks. Therefore, in the image processing computer 30, a point (i, j, dp) on the distance image is transformed into a coordinate system provided in the real space to perform processes such as recognition of the road configuration, detection of the position of solid objects and the like.

That is to say, with respect to the three-dimensional coordinate system fixed to a self vehicle in the real space, setting X axis on the right side with respect to the traveling direction of the self vehicle (vehicle 1), Y axis in the upward direction of the vehicle 1 and Z axis in the forward direction of the vehicle and placing an origin of the coordinates on the road surface underneath the center of two CCD cameras 10a, 10b, X-Z plane (Y=0) coincides with the road surface, if the road is flat. Accordingly, the point (i, j, dp) on the distance image can be transformed into a point (x, y, z) in the real space as follows:

$$x = CD/2 + z \cdot PW \cdot (i - IV) \tag{1}$$

$$y = CH + z \cdot PW \cdot (j - JV) \tag{2}$$

$$z = KS/dp \tag{3}$$

where CD is an interval between CCD cameras 10a, 10b; PW is an angle of visibility per picture element; CH is a height of CCD cameras when measured from the road surface; IV, JV are coordinates of an infinite point directly in front of the vehicle 1 on the image; and KS is a distance coefficient (KS=CD/PW).

Rewriting the above equations (1), (2) and (3) as follows:

$$i = (x - CD/2)/(z \cdot PW) + IV \tag{4}$$

$$j = (y - CH)/(z \cdot PW) + JV \tag{5}$$

$$dp = KS/z \tag{6}$$

Next, processes in the recognition/judgment computer 30 will be described.

In the microprocessor 30a, first, actual lane markers of a road are extracted from three-dimensional positional information contained in the distance image which is stored in the distance image memory 20b and then the configuration of the road is recognized by modifying parameters of a built-in road model so as to agree with the actual road configuration.

The road model described above is expressed by a plurality of three-dimensional linear equations. That is, the imaged left and right lane markers of the road on which the subject vehicle is traveling are divided into a plurality of intervals determined according to distance and the road model is formed by a plurality of broken lines each of which is expressed for every interval in the following three-dimensional linear equations:

$$x = a \cdot z + b \tag{7}$$

$$y = c \cdot z + d \tag{8}$$

where a, b are parameters of a linear equation extended in the horizontal direction in the coordinate system of the real space and c, d are parameters of a linear equation extended in the vertical direction in the coordinate system of the real space.

In the microprocessor 30b wherein the detection of solid objects is processed, the distance image is divided into lattice-like strips having a prescribed interval and data of solid objects are extracted for every strip. Then, a histogram is produced per each of these strips based on the data of solid objects and the position on the X-Y plane of solid objects representing respective strips and the distance thereto are obtained from the histogram. Then, comparing the image successively from the left to the right, the images having close distances in the forward and backward direction (Z-axis direction) and the lateral direction (X-axis direction) are classified into the same group. Further, when the arrangement direction of the data is checked, the portion where the arrangement direction is largely changed is found, the group being divided in a different group.

Further, based on the arrangement direction of the distance data of the overall groups, i.e., the gradient with respect to the Z-axis, the groups are classified into faced wall groups or side wall groups. For the faced wall groups, parameters such as a mean distance, X coordinates of the left and right ends and the like are calculated from the distance data of the group. Further, for the side wall groups, parameters such as the arrangement direction (gradient with respect to the Z-axis), the positions of the forward and backward ends in terms of Z-X coordinates and the like are calculated. Thus, the side surface of a solid object and the structure such as a guardrail are detected as the side wall arranged along the road.

With respect to the generation of distance image, the process of detecting the configuration of roads from the distance image and the process of the judgment of collision or contact with obstacles, details of which are described in Japanese Patent Application Laid-open No. Toku-Kai-Hei 5-265547 and No. Toku-Kai-Hei 6-266828 both of which have been proposed by the applicant of the present invention.

The present invention is characterized in that even when the road is curved, the wall surface can be recognized up to the far distance along the curved road. The process in the microprocessor 30b will be described according to the flowcharts shown in FIG. 3 through FIG. 8.

Figure 3:
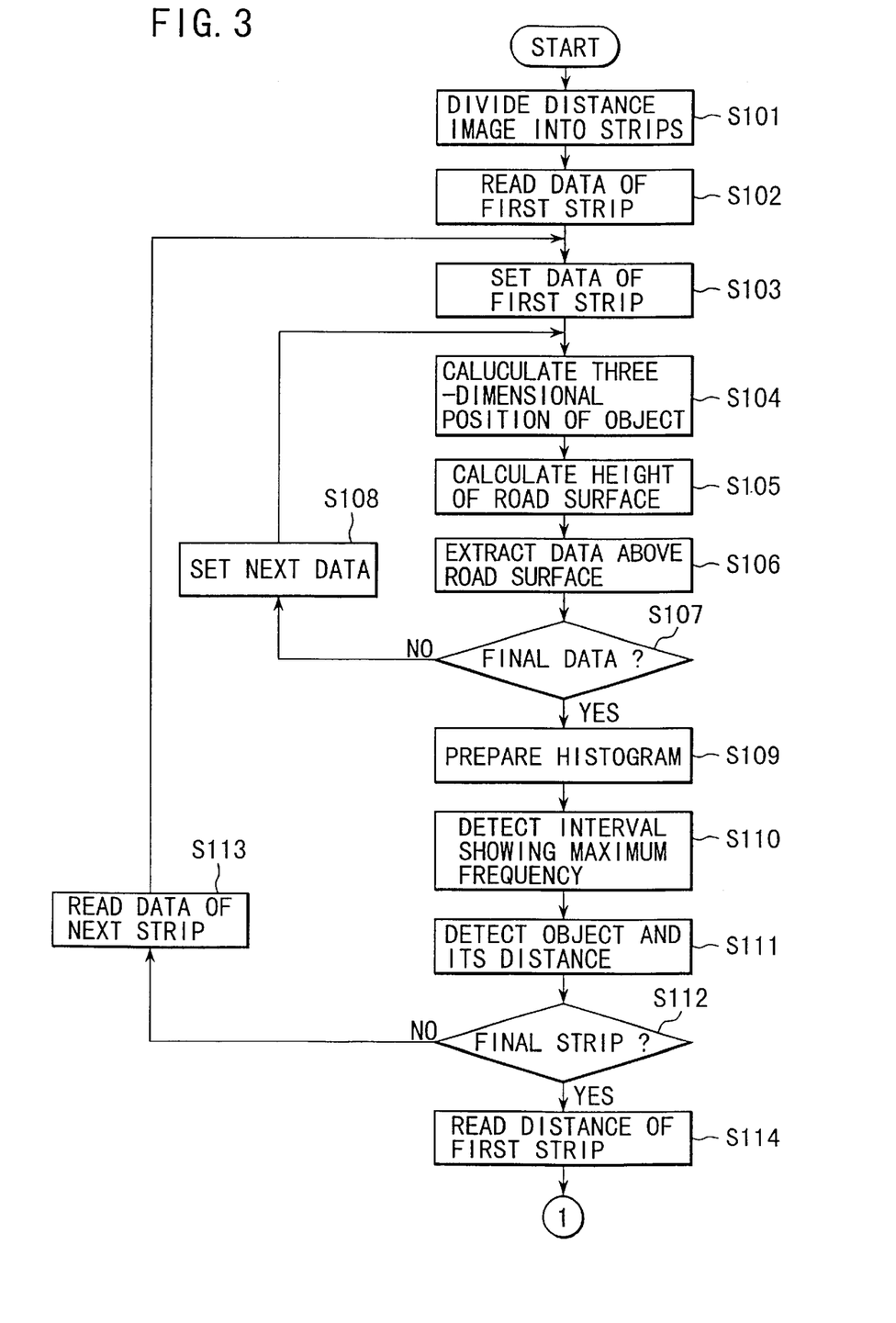
FIG. 3 is a first flowchart showing a flow of control of a solid object/side wall group detecting process.
Figure 4:
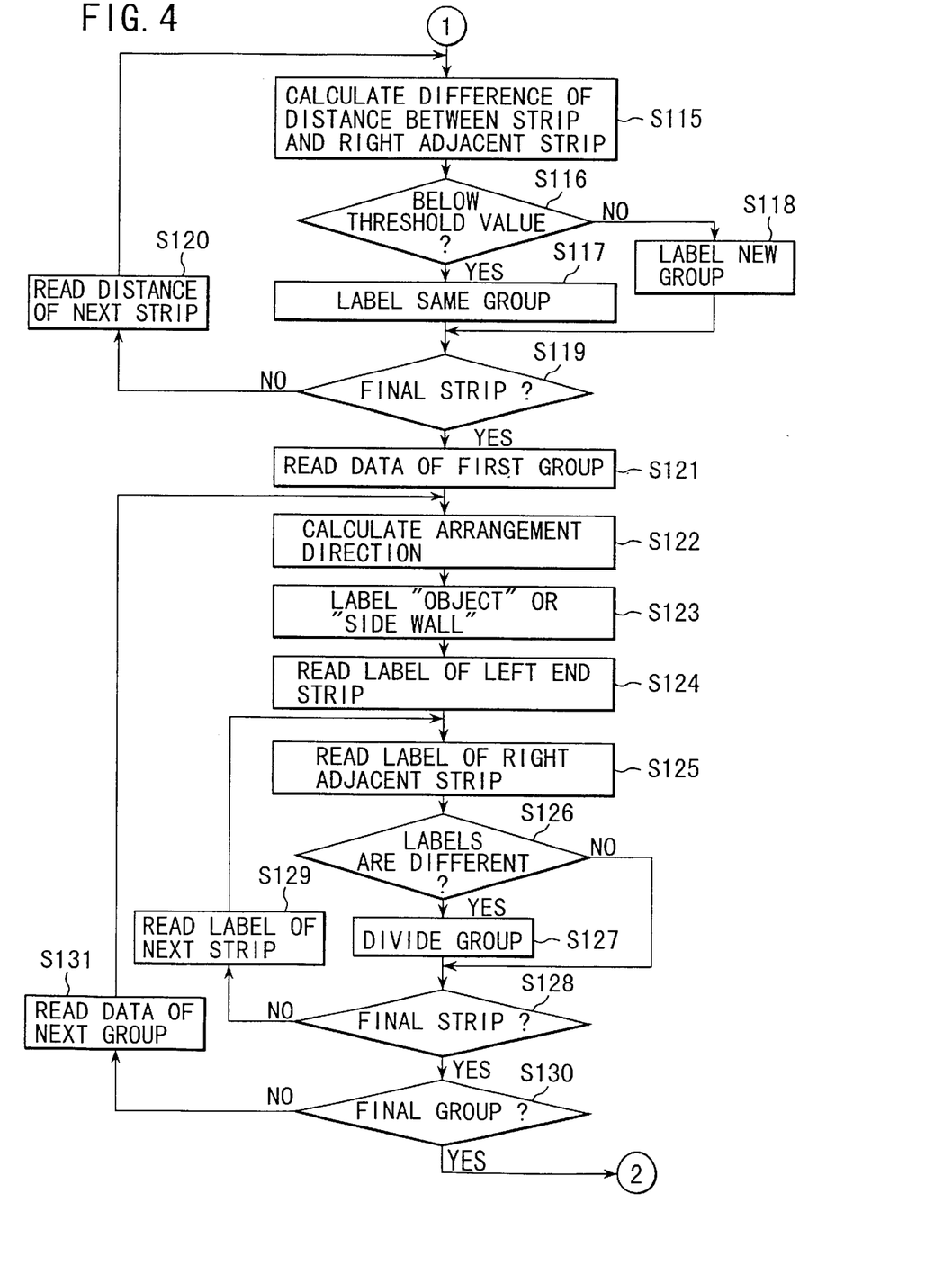
FIG. 4 is a second flowchart showing a flow of control of a solid object/side wall group detecting process.
Figure 5:
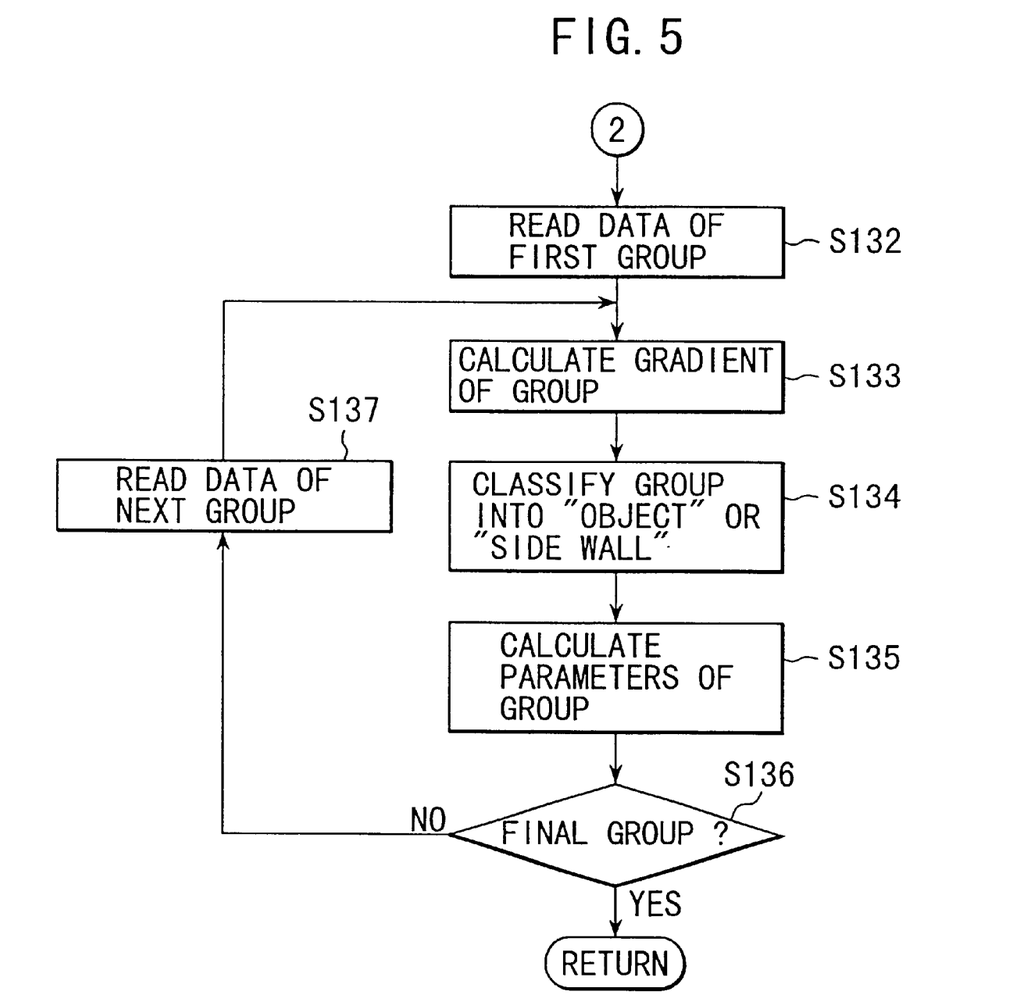
FIG. 5 is a third flowchart showing a flow of control of a solid object/side wall group detecting process.

The programs shown in FIGS. 3 through 5 are ones for classifying the faced wall group and the side wall group by processing the distance data obtained from the distance image. First, at a step S101, the distance image is divided into lattice-like strips having a given interval (for example 8 to 20 picture elements) and at S102 data of a solid object are extracted for every strip and the data of the first strip are read to calculate the distance to the object.

Next, the program goes to S103 where the data of the first strip are set and at S104 the three-dimensional position (x, y, z) of the object is obtained according to the aforesaid equations (1) to (3). Then, the program goes to S105 where the height yr of the road surface at the distance z is calculated according to the linear equations (7) and (8) expressing the road configuration. In case where the road configuration can not be recognized for example on a road having no lane marker, the road surface being assumed to be in a horizontal relation with the vehicle 1, the road height is established to be zero for example.

Next, the program goes to S106 where the data above the road surface are extracted as the solid object data based on the height H from the road surface which is calculated according to the following equation (9).

$$H = y - yr \quad (9)$$

In this case, if the height H of the object is 0.1 meters or smaller, since the object of this size is supposed to be a lane marker, a stain or a shadow on the road, the data of the object are discarded. Similarly, since the object which is located at a position higher than the self vehicle 1 is supposed to be a bridge or a signpost, that object is discarded. Thus, only the data of objects which are estimated to be solid objects on the road are selected.

After that, the program goes to S107 where it is checked whether or not the data is final one of the strip. If the data is not final, after the next data is set at S108, the program returns to S104 and similar processes are repeated to extract the data above the road surface. Further, when the final data of the strip are finished to be processed, the program goes from S107 to S109 wherein a histogram is prepared. The histogram is composed of a number of data contained within a predetermined interval of the distance z which is aligned on the lateral axis.

At the next step S110, if there is an interval in which the frequency (number of data) is above a threshold value and further indicates a maximum value, it is judged that a solid object exists within that interval and the distance to the object is detected. Thus prepared histogram also contains data erroneously detected and therefore some data appear in the position where no object exists. However, it should be noted that if there is an object having some degrees of size in a position, the frequency at the position shows a relatively large value and if there is no object, the frequency is relatively small.

Accordingly, it is permissible to judge that if the frequency of the histogram exceeds a predetermined threshold value and besides shows a maximum value in an interval, an object exists in the interval and that if the maximum value of the frequency is below the threshold value, no object exists. Even in case where some amount of noises are included in the image data, it is possible to detect an object with minimum effect of noises.

After that, the program goes from S111 to S112 where it is checked whether or not the process has reached a final strip. If it is judged that the process has not yet reached a final strip, the program returns to S103 and similar processes are repeated. when the process reaches the final strip, the program goes from S112 to S114.

Figure 11:
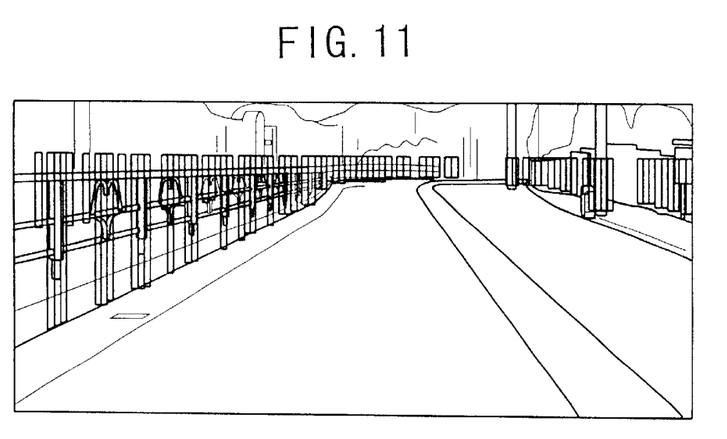
FIG. 11 is an explanatory view showing the position of solid objects detected per respective strips.

FIG. 11 is a view showing the position of solid objects detected for each strip from the original image. The distance data of these solid objects are classified into groups having a close distance with each other by the processes executed at the steps S114 to S120. The grouping will be performed as follows. In these processes, the detected distances of the solid objects in respective strips are investigated. If the difference of the detected distances to the solid objects between adjacent strips is smaller than a threshold value, these objects are deemed to be the same objects and on the other hand, if that difference exceeds the threshold value, those objects are regarded as different objects.

Specifically, at S114, the first strip (for example, a strip of the left end) is investigated and if a solid object is detected therein, the distance data are read and this strip R1 is classified into a group G1 having a distance Z1. Next, the program goes to S115 where the right adjacent strip R2 is investigated. If no solid object is detected in the strip R2, it is judged that the group G1 exists within the strip R1 or in the neighborhood thereof and the distance is Z1. On the other hand, if a solid object is detected in the strip R2 and the distance to the object is Z2, the distance Z1 of the strip R1 is compared with the distance Z2 of the strip R2.

After that, the program goes to S116 where it is judged whether or not the difference between the distances Z1 and Z2 is smaller than a threshold value and if the difference is smaller than the threshold value and is close to each other, it is judged at S117 that the solid object detected in the strip R2 belongs to the same group G1 to label as such and then the program goes to S119. At this moment, the distance to the object is established to be a mean value of Z1 and Z2.

On the other hand, in case where the difference of the distances Z1 and Z2 exceeds the threshold value, the program goes from S116 to S118 in which, judging that the solid object detected in the strip R2 does not belongs to the group G1, the solid object is labeled as belonging to a new group G2 having a distance Z2 and then goes to S119.

At S119, it is investigated whether or not the process has reached a final strip and if not, after the distance of the next strip is read at S120, the program returns to S115 and further the right adjacent strip is investigated. If the process has reached the final strip, the program goes from S119 to S121.

The following case should be noted. Assuming the situation where a vehicle parks beside a guardrail, there is a possibility that the distance data of the guardrail are deemed to belong to the same group as the distance data of the parked vehicle. In order to avoid this, the arrangement direction of the distance data is checked on the X-Z plane through the processes at S121 to S131 to divide the group of the arrangement direction into a portion in parallel with Z-axis and a portion in parallel with X-axis.

That is, at S121 the data of the first group are read and at S122 the arrangement direction of the data of the respective strips is calculated. Further, at S123 these strips are labeled as faced wall or "side wall", respectively. Specifically, first two points on the X-Z plane are picked up from the data of the first group. One point (X1, Z1) is a middle point of a strip K1 at the left end of the first group and the other point (Xp, Zp) is a middle point of a strip far away from the left end strip K1 by an interval of N strips in the right hand direction. Then, a line connecting these two points is drawn on the X-Z plane and a gradient A1 of the line is calculated. When the gradient A1 is compared with a prescribed value, for example 45 degrees, if the gradient A1 is larger than the value, the strip K1 is labeled as "side wall" and if the gradient A1 is smaller than the value, the strip K1 is labeled as faced wall.

The interval N between strips is preferably N=2 to 4. The reason is that N=1, namely, an adjacent strip may produce fluctuations in the arrangement direction of the data due to the dispersion of detected distance and as a result it becomes difficult to make discrimination between "side wall" and faced wall. Therefore, it is suitable to use not an adjacent strip, but a strip a little distant. Hereinafter, the labeling of "side wall" or faced wall is performed successively from the left end strip up to the strip apart by N strips on the left side of the right end strip.

When the labeling is accomplished for each strip of the group, the program goes from S123 to S124 where the label of the left end strip is read and at the next step S125, the label of the right adjacent strip is read. Then, it is investigated whether or not the label of the left end strip is different from that of the right adjacent strip. As a result, if the label of the left end strip is the same as that of the right adjacent strip, the program skips to S128 and if different, the program steps to S127 where the strip labeled "side wall" and the strip labeled faced wall are divided into different groups respectively. The division of the group is performed at the position apart by N/2 strip on the right side of the position where the label changes from "side wall" to faced wall and vise versa.

In this case, to avoid the situation where the label itself is erroneously labeled due to the dispersion of distance data, the division is performed only when more than three same labels are successive.

At S128, it is checked whether or not the process comes to the final strip and if not, after reading the label of the next strip at S129, the program returns to S125 and hereinafter similar processes are repeated. When the process comes to the final strip, the program goes from S128 to S130 where it is investigated whether or not the process reaches the final group. When the process does not yet reach the final group, the data of the next group are read and hereinafter the same processes are carried out repeatedly. When the process reaches the final group, the division of the groups is completed and the program goes from S130 to S132.

The following steps S132 to S137 are of processes in which further classifications of "side wall" or faced wall are carried out to raise the accuracy of the classification performed at S127. After the data of the first group are read at S132, at S133 approximate straight lines are obtained from the positions (Xi, Zi) within the group according to the Hough transformation or the linear square method to calculate a gradient overall the group.

Then, the program goes to S134 where the group is reorganized such that the group having a gradient inclined toward X-axis is classified into the faced wall group and the group having a gradient inclined toward Z-axis is classified into the "side wall" group. Further, at S135, miscellaneous parameters of the group are calculated. With respect to the group classified faced wall, these parameters include an average distance which is calculated from the distance data within the group, X-coordinates at the left and right ends of the group and the like and with respect to the group classified "side wall", those parameters include an arrangement direction of the data (gradient with respect to Z-axis), Z, X coordinates of the front and rear ends of the group and the like. In this embodiment, in order to raise the accuracy of classification, the group is reclassified according to the calculated gradient of the overall group, however this reclassification may be omitted.

Further, the program goes from S135 to S136 where it is judged whether or not the process has reached the final group. If it is not the final group, the program goes back to S137 in which the data of the next group are read and returns to S133 to repeat the same processes. When the process has reached the final group, the program leaves the routine.

Figure 6:
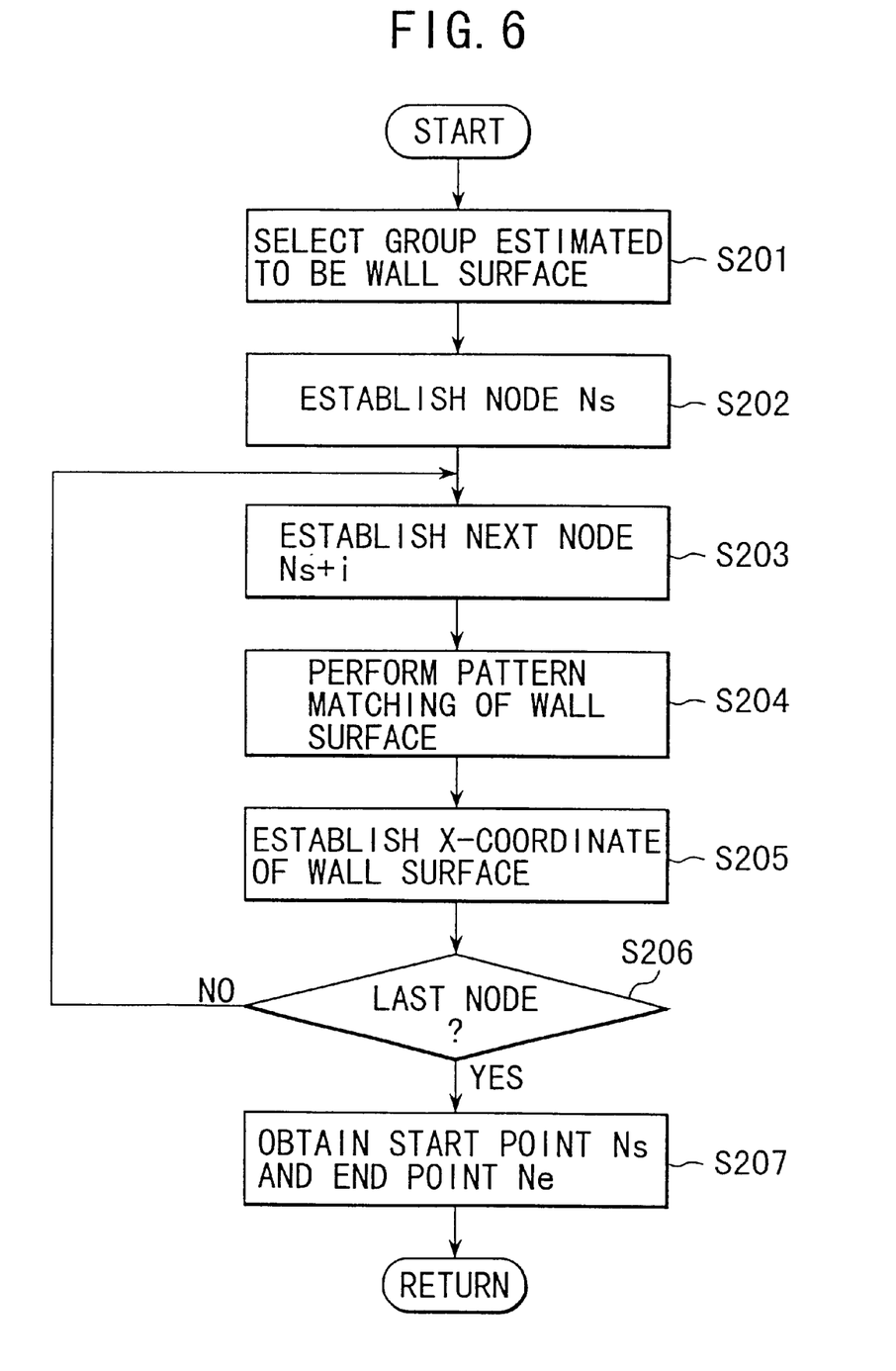
FIG. 6 is a flowchart showing a flow of control of a wall surface detecting process.
Figure 12:
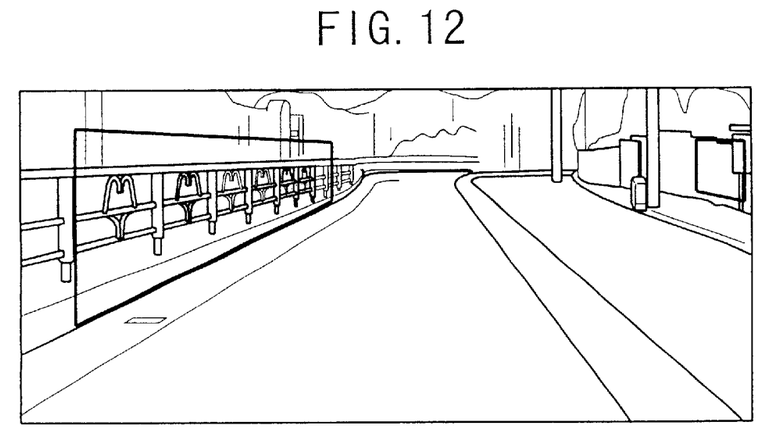
FIG. 12 is an explanatory view showing the result of detection of side walls.
Figure 13:
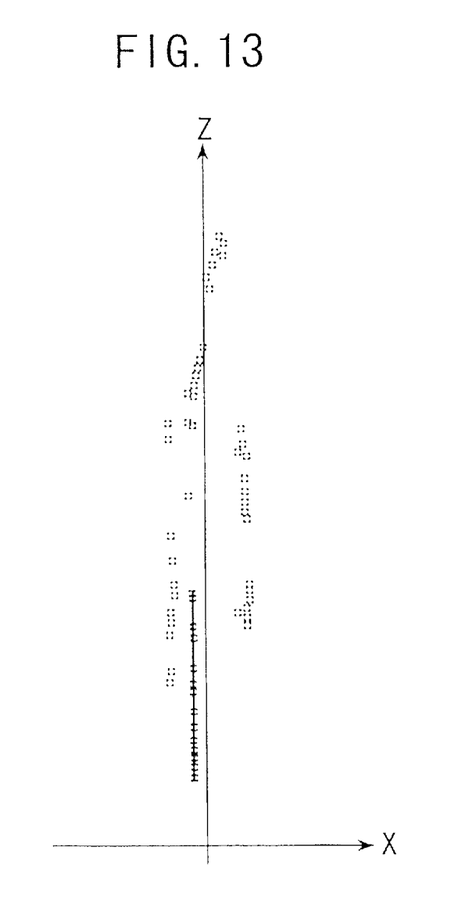
FIG. 13 is an explanatory view showing the result of detection of side walls in terms of the X-Z plane.

FIG. 12 shows a result of the detection of the side wall. When the data of the groups are illustrated on the X-Z plane, as shown in FIG. 13, they are recognized as "side wall" groups. In this case, portions along a curved road are not recognized. The program shown in FIG. 6 is for recognizing the wall surface along the curved road using the data of the "side wall" group obtained by the program described before.

First, at S201, groups estimated to be a wall surface are selected from the groups classified "side wall" and at the steps after S202, a wall surface is searched based on the data of the "side wall" groups using the following wall surface model.

Figure 14:
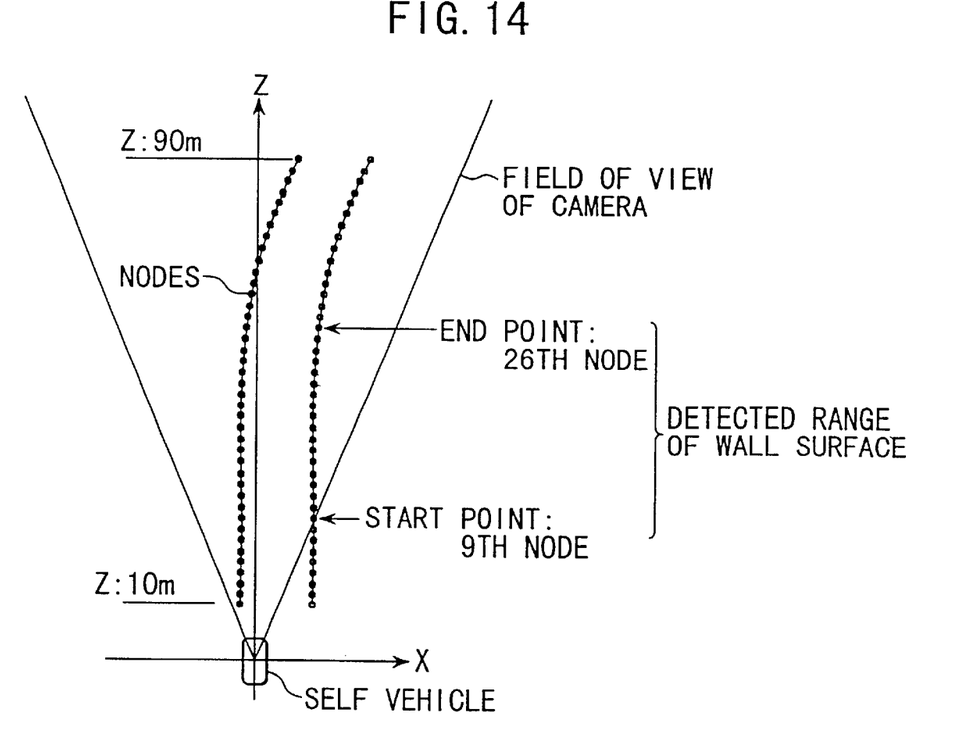
FIG. 14 is a schematic view showing a wall surface model.

The wall surface model is shown in FIG. 14, in which the wall surfaces are expressed as border lines connecting between nodes provided at a specified interval within a given range. For example, the border line is constituted by 41 nodes arranged at an interval of 2 meters within an range from 10 to 90 meters ahead of the self vehicle. Respective nodes have successive reference numbers starting from the self vehicle side. The Z-coordinates of the respective nodes are fixed with respect to the vehicle position and the X-coordinates thereof are determined according to the procedure which will be described hereinafter.

At S202, a node $N_s$ corresponding to an end point on the vehicle side of the selected side wall group is established based on the Z-coordinate of the end point and the X-coordinate of the node $N_s$ is established being adjusted to the X-coordinate of the end point. Next, the program goes to S203 where the next node $N_{s+1}$ is established in the direction of the gradient of the side wall group. Next, when the node $N_{s+i}$ ($i \geq 2$) is determined, its direction is established along a direction of the second previous node.

Figure 15:
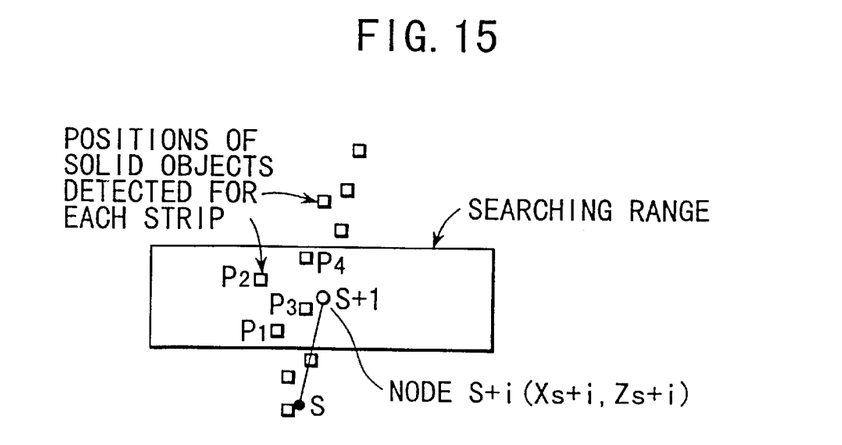
FIG. 15 is an explanatory view showing the way of searching a wall surface pattern.

Then, the program goes to S204 where, as shown in FIG. 15, the position of the wall surface is searched by a so-called "pattern matching" within a specified searching range to extract a solid object $P_i$ for every strip within the searching range. For example, the searching range in the X-axis direction has ±3 to 5 meters in the X-axis direction and ±1 meter in the Y-axis direction with its center placed at a coordinate ($X_{ns+i}$, $Z_{ns+i}$) of the node $N_{s+i}$ established at S203.

Figures 16, 17:
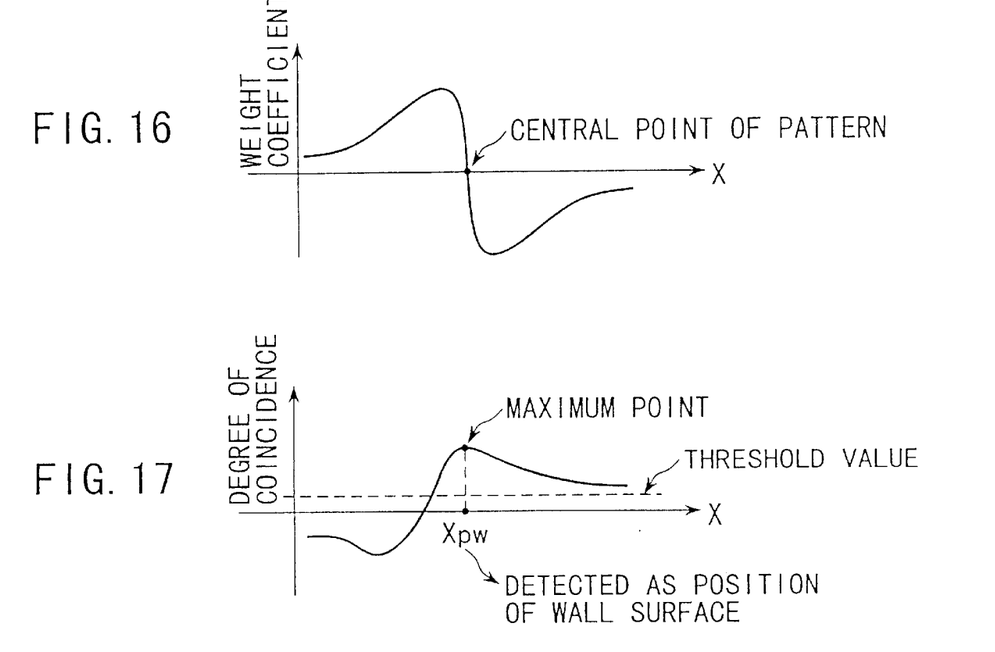
FIG. 16 is an explanatory view showing an example of a pattern of a weight coefficient.
FIG. 17 is an explanatory view showing the result of calculation of a degree of coincidence.

The matching of the wall surface pattern is performed to the solid object $P_i$ within the searching range. FIG. 16 shows an example of the wall surface pattern (weight coefficient pattern) used for the pattern matching. The wall surface pattern shown in FIG. 16 is a pattern for the wall surface on the left side and a symmetric pattern to this pattern is used for the wall surface on the right side. The lateral axis of this wall surface pattern coincides with the distance in the X-axis direction and the longitudinal axis indicates a weight coefficient. A maximum point of a degree of coincidence is searched while the central point of the wall surface pattern is shifted towards the X-axis. Specifically, as shown in FIG. 17, a weight $W_i$ is obtained with respect to the deviation of the solid object $P_i$ in the X-axis direction from the central point of the wall surface pattern to calculate the sum of the weight $W_i$ as a degree of coincidence F. Further, when the degree of coincidence F becomes maximum, the position of the central point of the wall surface pattern is recognized as a wall surface. When the maximum value of the degree of coincidence F is smaller than a threshold value, it is judged that there is no wall surface.

When the process of the step S204 finishes, the program goes to S205 at which a X-coordinate $X_{pw}$ of the central point of the wall surface pattern at the maximum point of the degree of coincidence F, is established as a X-coordinate of the wall surface pattern corresponding to the node $N_{s+i}$.

Then, the program goes to S206 where it is checked whether or not the node is the last one of the side wall group selected and if it is not the last node, the program goes back to S203 and the same processes are repeated. When the process reaches the last node, the program steps to S207 where the node having the smallest reference number (the node nearest to the self vehicle) and the node having the largest reference number (the node furthermost from the self vehicle), are searched respectively and leaves the routine after denoting them as a start point $N_s$ and an end point $N_e$, respectively.

After this program is carried out on the side wall groups on the left side, it is carried out on the side wall groups on the right side. In the example shown in FIG. 14, the wall surface from the 9th node to the 26th node is detected on the right side of the self vehicle and the 9th node is denoted as the start point $N_s$ and the 26th node is denoted as the end point $N_e$. These nodes are used for later processes as effective nodes.

Figure 7:
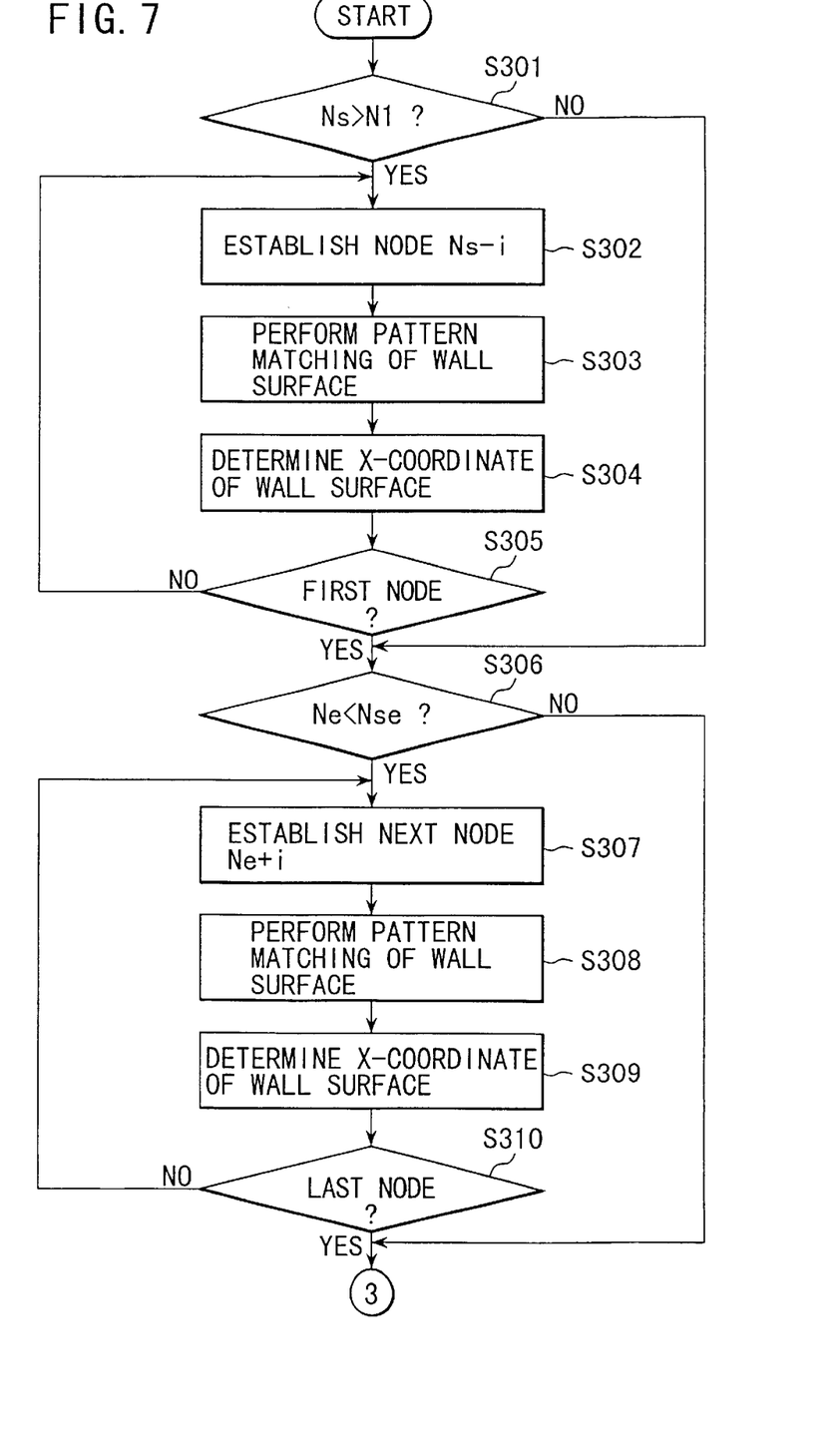
FIG. 7 is a first flowchart showing a flow of control of a wall surface position correcting process.
Figure 8:
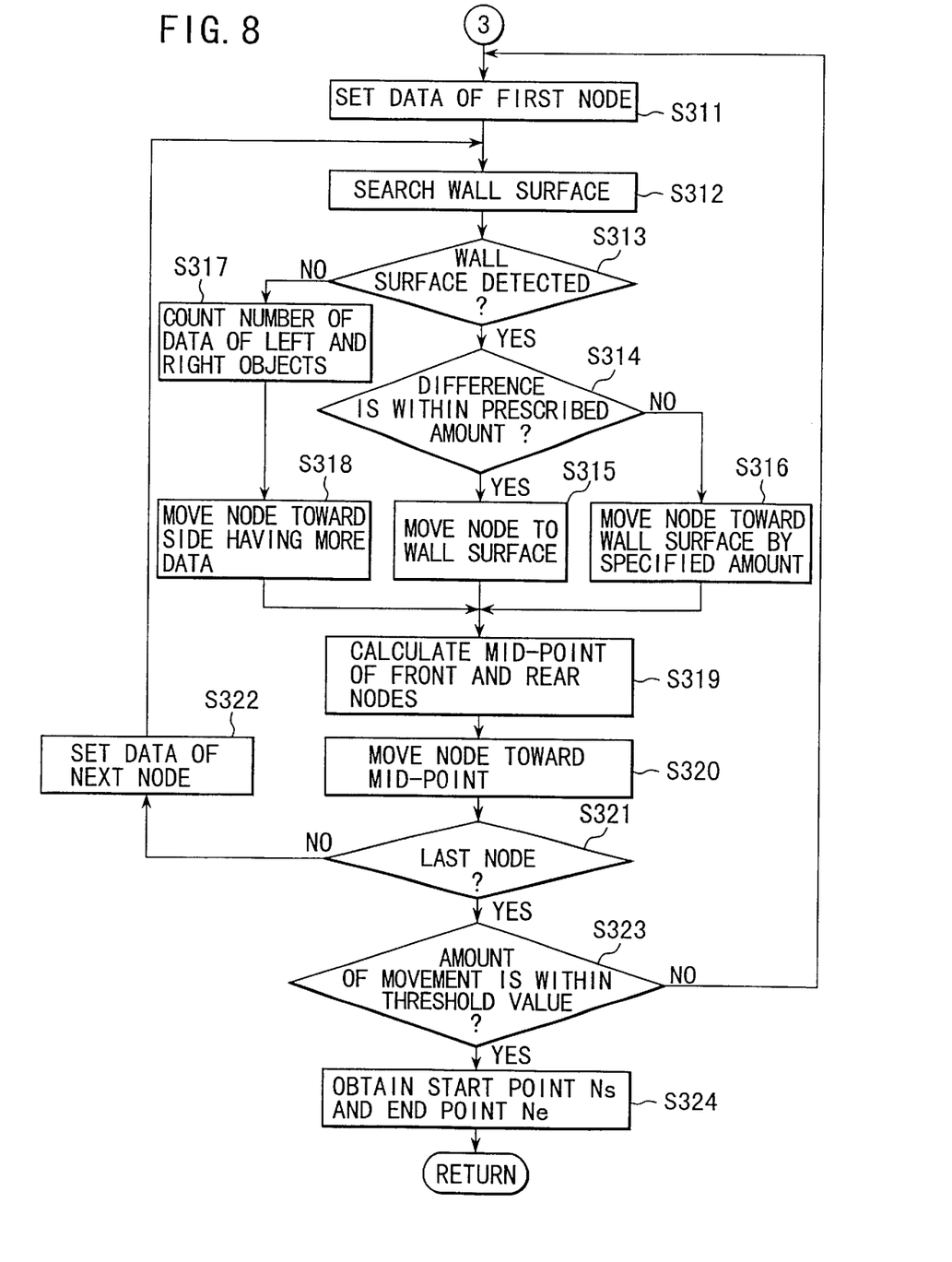
FIG. 8 is a second flowchart showing a flow of control of a wall surface position correcting process.

Thus processed position of the wall surface is further corrected by a program shown in FIG. 7 and FIG. 8 using new data obtained from programs shown in FIG. 3 through FIG. 5.

The programs shown in FIG. 7 and FIG. 8 is a program for correcting the wall surface. At S301, it is investigated whether or not the start point $N_s$ of the effective nodes is larger than the first node $N_1$ of the wall surface model. When $N_s = N_1$, the wall surface has been already detected up to the first node $N_1$, the program skips to S306. When $N_s > N_1$, the program goes to S302 where the previous node $N_{s-i}$ (i=1, 2, 3 etc.) is established. Then, at S303 the wall surface pattern is searched and at S304 the X-coordinate of the wall surface is determined based on the result of searching.

Next, the program goes from S304 to S305 where it is investigated whether or not the process has reached the first node. If not yet reached the first node $N_1$, the steps S302 to S304 are repeated to continue the searching of the wall surface position up to the node $N_1$. When the processes up to the first node $N_1$ are finished, the program goes to S306 where it is checked whether or not the end point $N_e$ of the effective nodes is smaller than the last node $N_{se}$ of the wall surface model (for example, node $N_{41}$ in case of the wall surface model constituted of 41 nodes).

As a result of this, when $N_e = N_{se}$, that is, the wall surface has been already detected up to the last node, the program skips from S306 to S311. When $N_e < N_{se}$, the program goes from S306 to S307 where the node $N_{e+i}$ after the end point $N_e$ is successively established and further at S308 the pattern matching of the wall surface is performed. According to the result of the pattern matching, at S309 the X-coordinate of the wall surface is determined and then at S310 it is checked whether or not the process has reached the last node $N_{se}$. The matching of the wall surface position is continued until the last node $N_{se}$ and when the processes up to the last $N_{se}$ is finished, the program goes to S311.

These processes of establishing the nodes, the matching of the wall surface pattern and the determination of the X-coordinate at the steps S302 to S304 and the steps S307 to S309, are the same as the processes at the steps S203, 204 and S205 in the aforementioned program of the wall surface detecting process.

The processes after S311 are for correcting the position (X-coordinate) of respective nodes from the first node $N_1$ to the last node $N_{se}$. First, at S311 the data of the first node $N_1$ is set and the program goes to S312. The processes from S312 to S321 are repeatedly carried out by successively setting the data of the next node.

At S312, the wall surface at the node $N_i$ is searched and at S313 it is checked whether or not the wall surface is detected by the pattern matching. If it is judged that the wall surface is detected, the program goes from S313 to S314 where it is investigated whether or not the difference between the position $X_{pw}$ of the wall surface and the position $X_{ni}$ of the node is within a prescribed amount, for example, ±1 meter. If the difference is within the value, the program goes to S315 where the node is moved to the position of the wall surface ($X_{ni} \leftarrow X_{pw}$) and if the difference is out of the value, the program goes to S316 where the node is moved toward the wall surface by a specified amount, for example, ±0.3 meters ($X_{ni} \leftarrow X_{ni} \pm 0.3$ meters).

On the other hand, when the wall surface is not detected by the pattern matching, the program diverges from S313 to S317 where the number $C_0$ of the data $X_{pi}$ of the solid objects located on the left side of the node $X_{ni}$ ($X_{ni} < X_{pi}$) and the number $C_1$ of the data $X_{pi}$ of the solid objects located on the right side of the node $X_{ni}$ ($X_{ni} > X_{pi}$), are counted respectively. Then, at S318 the node is moved towards the side having more data of solid objects by a specified amount, for example 0.8 meters ($X_{ni} \leftarrow X_{ni} \pm 0.8$ meters).

Thus, in case where there is no wall surface pattern detected near the node, the position of the node can be neared in the direction where the wall surface likely exists even when the node is largely apart from the wall surface.

Figure 18:
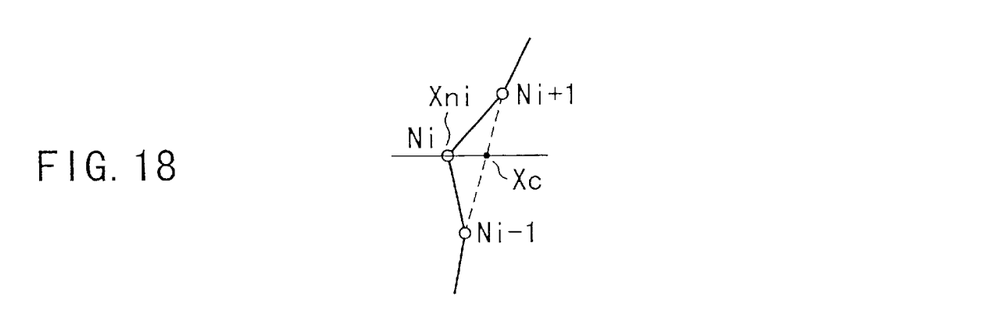
FIG. 18 is an explanatory view showing the connection of nodes.

When the position of the node is moved through either step of S315, S316 and S318, the program goes to S319 where a position $X_c$ of a mid-point of a straight line connecting a node $N_{i+1}$ (adjacent node on far side) and a node $N_{i-1}$ (adjacent node on near side) is obtained and then goes to S320 where, as shown in FIG. 18, the node Ni is moved toward the mid-point $X_c$ just like in a manner that the mid-point $X_c$ attracts the node $N_i$ by a spring force. The amount of the movement should be retained as much as ½ to ⅓ of the length between the node $N_i$ and the mid-point $X_c$.

That is, the wall surface detected by the pattern matching generally contains irregularity due to the effect of the dispersion of data but a real guardrail or real side wall, in most case, is smoothly curved along a road. The process at S320 is a means for obtaining a smooth curve by applying a spring operation as described above. As a conventional method of smoothing the configuration composed of nodes, a least square method is well known, however the aforegoing method using a spring operation is more advantageous in calculation speeds than such a conventional method.

After that, the program goes to S321 where it is investigated whether or not the process has reached the last node $N_{se}$ and if it has not reached the last node point, the program returns to S321 after setting the data of the next node at S322 and the same processes are repeated. When the process at the last node $N_{se}$ is finished, the program goes from S321 to S323 where it is checked whether or not the amount of the movement comes within a threshold value (for example, ±0.1 meters) for all of the points.

Further, if a node exceeding the threshold value is found, the program goes back to S311 and thereafter the correcting processes are repeated for all nodes from the first to the last. When the amount of the movement for all node points comes within the threshold value, the start point $N_s$ and the end point $N_e$ within the detecting range of the nodes are obtained and the program leaves the routine. Through thus constituted program, erroneously detected data and others are corrected during repeated processing and as a result the configuration of the wall similar to the actual wall surface is obtained. After the program is finished to be carried out with respect to the side wall groups on the left side, the program is carried out with respect to those on the right side.

Figure 19:
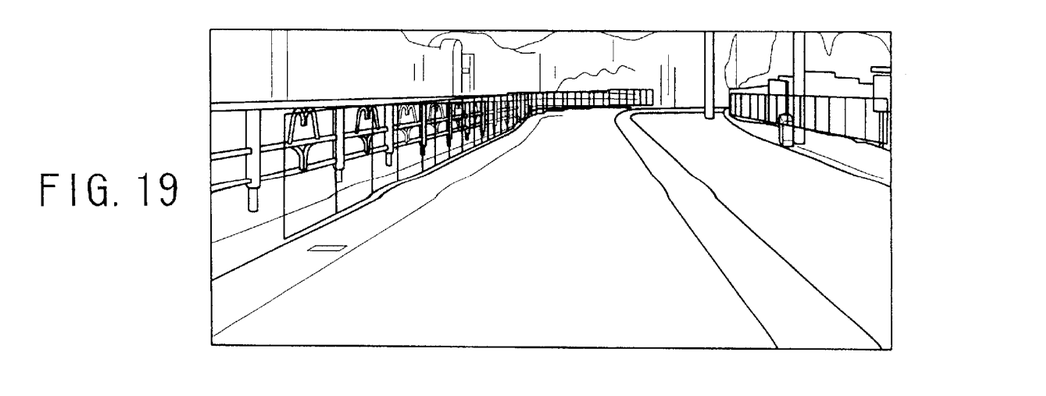
FIG. 19 is an explanatory view showing the result of detection of wall surfaces.
Figure 20:
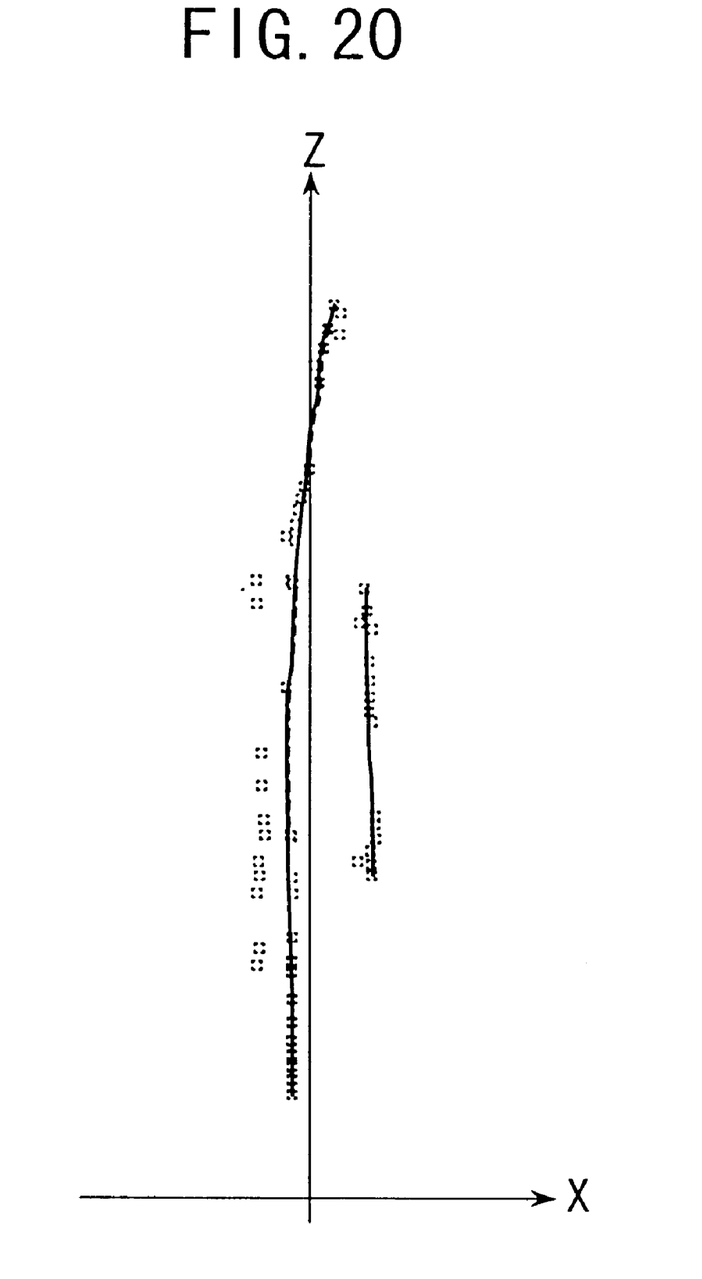
FIG. 20 is an explanatory view showing the result of detection of wall surfaces in terms of the X-Z plane.

FIG. 19 shows a result of the detection of the wall surface located from near to far along a curved road on the basis of the original image shown in FIG. 9 and the corrected wall surface model expressed on a X-Z plane is shown in FIG. 20. Comparing this wall surface model with the one detected in the form of straight lines as shown in FIG. 13, it is understood that the wall surface can be recognized up to far.

This wall surface model can be applied not only to a guardrail but also to a line of trees, walls of houses, an array of parked cars and other solid objects lined along a road and these objects can be detected as a series of wall surfaces. Therefore, it is possible to recognize the configuration of a road even in case of a road whose lane markers can not be recognized, for example a snow-covered road.

While the presently preferred embodiment of the present invention has been shown and described, it is to be understood that this disclosure is for the purpose of illustration and that various changes and modifications may be made without departing from the scope of the invention as set forth in the appended claim.

What is claimed is:

1. A vehicle surroundings monitoring apparatus having a stereoscopic image detecting unit for detecting a stereoscopic image of solid objects around a self vehicle, an image processor for processing said image into a distance image and a plurality of microprocessors for recognizing said solid objects based on said distance image, comprising:

wall surface detecting means for dividing positional data of said solid objects into groups and for detecting a wall surface formed along a boundary of a road based on said grouped positional data of said solid objects, said detecting means being responsive to forward and lateral distances of images for grouping images and determining gradients of image data;

wall surface model forming means for interconnecting a plurality of nodes and for forming a wall surface model based on said interconnected nodes to express an outline of said wall surface, a wall surface being identified by a gradient;

wall surface model correcting means for correcting said wall surface model based on said grouped positional data of said solid objects;

wherein said wall surface model correcting means comprises means for applying a pattern matching to said grouped positional data to search a position of said wall surface corresponding to said respective nodes, and means for correcting coordinates of said nodes based on said position of said wall surface; and wherein said pattern matching uses a wall surface pattern having weight coefficients, values of said weight coefficients being positive on one side of a central point and negative on an opposite side thereof, wherein absolute values of the weight coefficients become smaller with increasing distance from the central point.

2. The apparatus according to claim 1, wherein said wall surface model correcting means comprises means for correcting said coordinates of said corresponding nodes in the direction where said positional data of said solid objects within a searching range exist when said pattern matching detects no wall surface.

3. The apparatus according to claim 1, wherein said wall surface model correcting means comprises means for correcting said coordinates of said respective nodes in the direction of bringing them close to a straight line connecting one adjacent node and the other adjacent node after said wall surface model is corrected based on said grouped positional data of said solid objects.

* * * * *